US005474380A

United States Patent [19]
Sukup

[11] Patent Number: 5,474,380
[45] Date of Patent: Dec. 12, 1995

[54] METHOD FOR ADDING MOISTURE TO PARTICULATE MATERIAL

[75] Inventor: Eugene G. Sukup, Hampton, Iowa

[73] Assignee: Sukup Manufacturing Company, Sheffield, Iowa

[21] Appl. No.: 432,933

[22] Filed: May 1, 1995

Related U.S. Application Data

[62] Division of Ser. No. 281,791, Jul. 27, 1994.

[51] Int. Cl.$^6$ .............................. B01F 5/04; B05B 17/04
[52] U.S. Cl. .................................. 366/151.1; 366/172.1; 366/261; 239/63
[58] Field of Search .................................... 366/6, 17, 40, 366/65, 66, 151.1, 168.1, 172.1, 172.2, 261, 603; 239/63, 142, 662

[56] References Cited

U.S. PATENT DOCUMENTS

| | | |
|---|---|---|
| 1,513,174 | 10/1924 | Kruger. |
| 2,167,674 | 8/1939 | Offutt ................................... 366/172.2 |
| 2,861,787 | 11/1958 | Csanyi. |
| 3,156,541 | 11/1964 | Kalke. |
| 3,365,177 | 1/1968 | Daman. |
| 3,580,549 | 5/1971 | Murphy. |
| 3,727,894 | 4/1973 | Ahrenberg. |
| 3,776,512 | 12/1973 | McKinnon. |
| 3,817,261 | 6/1974 | Rogge. |
| 3,841,610 | 10/1974 | Hanzawa et al.. |
| 4,055,673 | 10/1977 | Mueller et al.. |
| 4,145,143 | 3/1979 | Fontaine ................................... 366/40 |
| 4,186,592 | 2/1980 | Eirich ................................... 366/17 |
| 4,248,538 | 2/1981 | Sukup. |
| 4,274,750 | 6/1981 | Smit. |
| 4,381,703 | 5/1983 | Crimmins et al.. |
| 4,664,028 | 5/1987 | Mattson. |
| 4,836,686 | 6/1989 | Sukup. |
| 4,854,719 | 8/1989 | Sukup. |

Primary Examiner—David Scherbel
Assistant Examiner—Randall E. Chin
Attorney, Agent, or Firm—Zarley, McKee, Thomte, Voorhees & Sease

[57] ABSTRACT

The method for adding moisture to particulate material involves placing the particulate material in the lower portion of a bin; rotating vertically disposed spaced augers about a longitudinal axis, and moving said augers in concentric paths through the particulate material. Moisture is then sprayed on the upper surface of the particulate material adjacent the augers.

1 Claim, 4 Drawing Sheets

METHOD FOR ADDING MOISTURE TO PARTICULATE MATERIAL

CROSS-REFERENCE TO A RELATED APPLICATION

This is a divisional of application Ser. No. 08/281,791 filed on Jul. 27, 1994.

BACKGROUND OF THE INVENTION

Most grains cannot be stored when they possess a moisture content of more than 15%. While "dry" corn is suitable for animal feed at this reduced moisture level, other grains, such as rice, does not cook well at that reduced moisture level. Accordingly, it is necessary to add moisture to rice so that the moisture content thereof is at the 17% level to obtain optimum cooking conditions.

Current devices and methods for re-moisturizing rice are very expensive (e.g., $45,000) and are not completely accurate, are not easy to operate, and consume considerable time and attention to function.

It is, therefore, a principal object of this invention to provide a method for adding moisture to particulate material, such as grains, which is economical, which is fully automatic, which is relatively fast, and which can be conducted by an average person with a reasonable amount of training.

These and other objects will be apparent to those skilled in the art.

SUMMARY OF THE INVENTION

The machine involving the method of this invention for adding moisture to particulate material for use in a bin which has an upper portion with an elongated supporting rail thereon includes an elongated substantially horizontal support member. A rail adapter element is on the outer end of the elongated member to engage the supporting rail on the bin. A swivel support element is secured to the other end of the elongated member and is adapted to be connected to the center of the bin structure for holding the other end of the elongated member at a level position with respect to the outer end.

A motor is connected to the elongated member for rotating the same about a horizontal axis. A pair of support brackets are longitudinally movably mounted on the elongated member. Mixing augers are mounted on the brackets and extend downwardly therefrom. A second power means on the support brackets serve to rotate the mixing augers about a vertical axis.

Fluid nozzles are mounted on the support brackets adjacent to the mixing augers and are connected to a source of fluid. A control means is connected to the motor and the second power means and to the fluid nozzles to cause rotation of the elongated member. The control means is also connected to the fluid nozzles to cause fluid to flow therethrough onto the particulate material in the bin while the mixing augers are moving through the particulate material.

The method of adding moisture to particulate material includes placing the particulate material in the lower portion of a bin; rotating vertically disposed spaced augers about a longitudinal axis, and moving said augers in concentric paths through the particulate material. Moisture is then sprayed on the upper surface of the particulate material adjacent the augers. By utilizing a computer, the existing moisture content of the particulate material is determined; the desired amount of moisture content of the particulate material is then registered in the computer; the computer then determines the quantity of the particulate material; and then calculates the amount of moisture to be added to achieve the desired moisture content. When that desired moisture content is achieved, the computer stops spraying moisture on the particulate material.

A BRIEF DESCRIPTION OF THE DRAWINGS

DESCRIPTION OF THE PREFERRED EMBODIMENT

Figure 1:
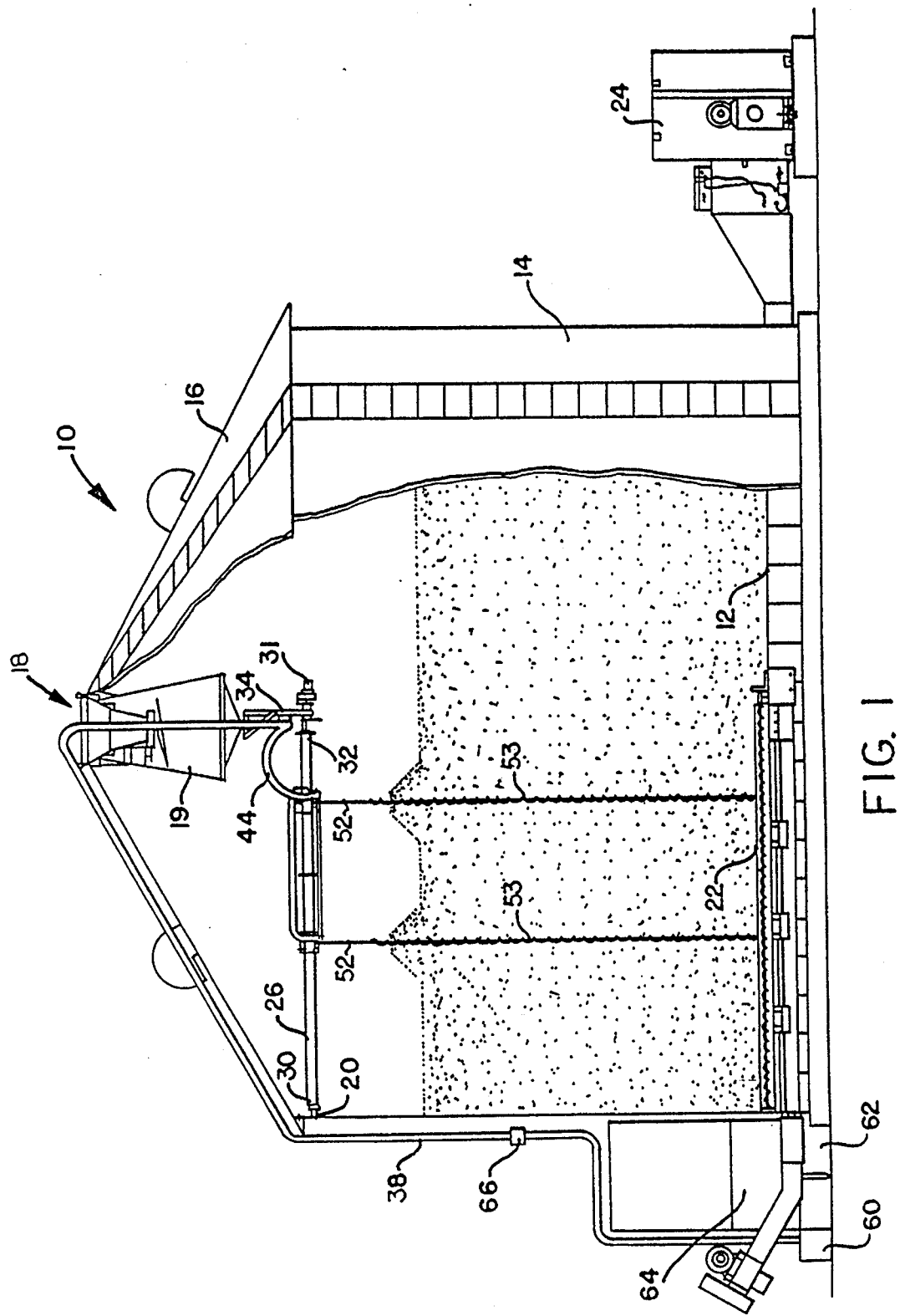
FIG. 1 is a partial vertical sectional view showing the schematic layout of the apparatus of this invention.

Grain stirring and aeration devices are old in the art and are typically illustrated by the following U.S. Pat. Nos.:

4,274,750

4,836,686

4,854,719

The numeral 10 represents a conventional grain bin with a hollow floor 12, vertical cylindrical sidewalls 14, and a roof 16 with a grain opening 18 at the apex thereof. A conventional grain spreader 19 is mounted in opening 18. A circular rail 20 is secured to the inner surface of the sidewalls 14 and extends around the upper portion of the interior of the bin. A conventional sweep auger 22 is mounted on top of the hollow floor 12, and a fan 24 is connected to the space under floor 12 to provide forced air to the interior of the bin.

An elongated roll member 26 has a rail adapter 28 on its outer end 30 and a conventional electric motor 31 mounted on the inner end 32. A bracket 34 is secured to the inner end of the roll member 26 and is secured to the top of the bin in any convenient way.

Figure 2:
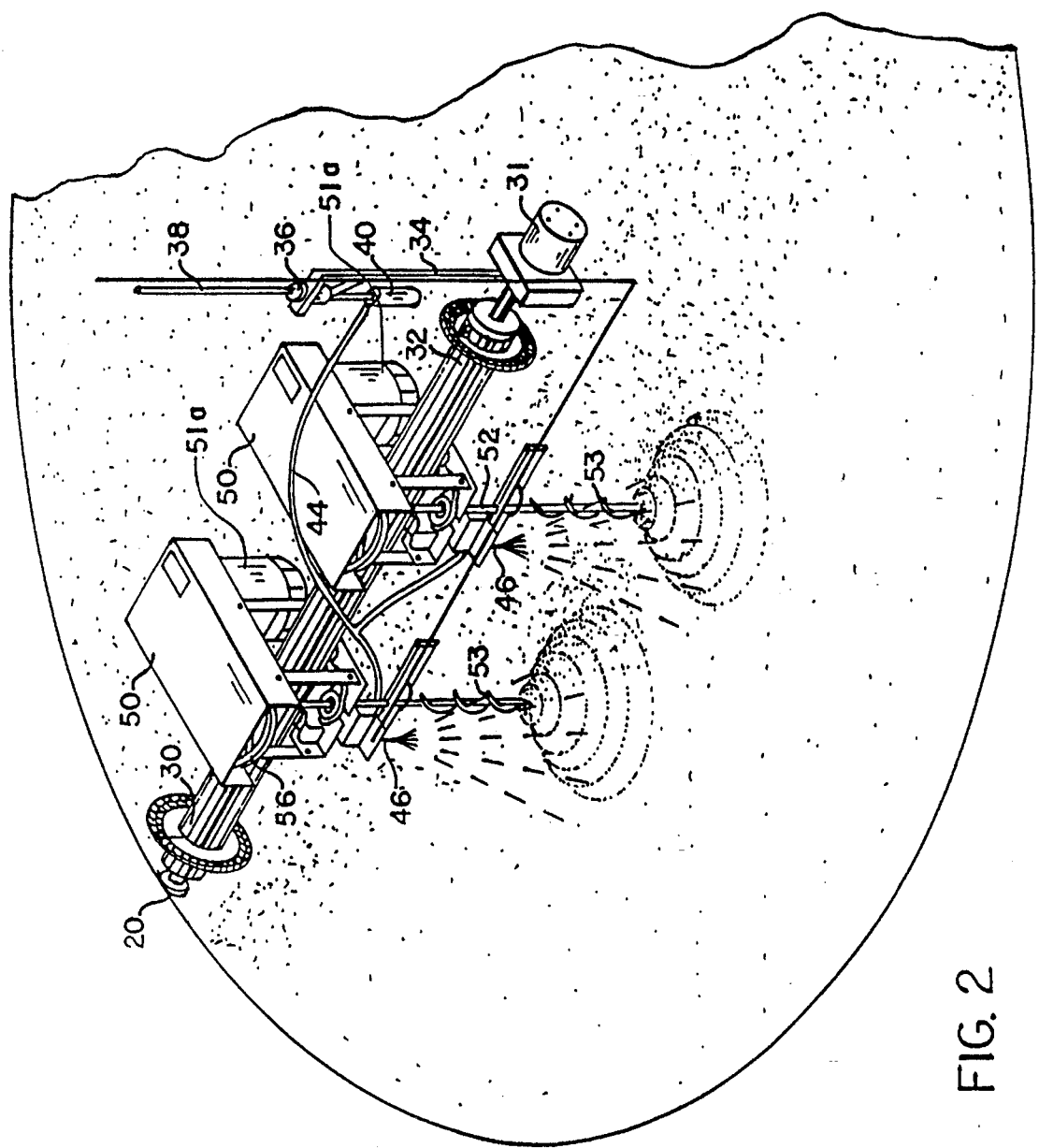
FIG. 2 is an upper perspective view of the apparatus of this invention as mounted in the upper portion of a grain bin.
Figure 3:
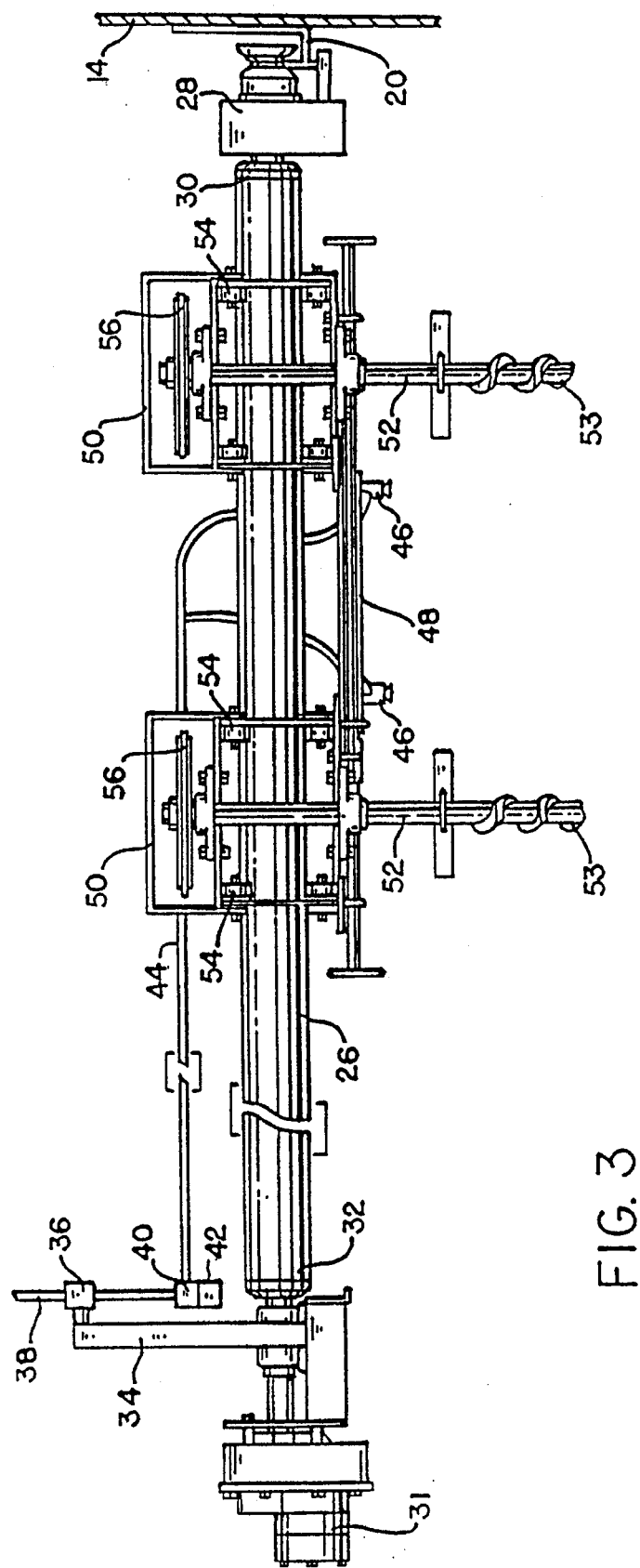
FIG. 3 is an enlarged scale elevational view of the stirring and moisture delivery system of the invention.

An elongated fluid conduit 38 extends through bearing support 36 and terminates in swivel 40. A solenoid valve 42 is attached to swivel 40 and is adapted to open and close the fluid passageway in swivel 40. A fluid line 44 extends from the output side of swivel 40 and is connected to nozzles 46 which are mounted on brackets 48 (FIG. 3) which extends between auger support brackets 50 which in turn are mounted on the elongated roll member 26. The auger support brackets 50 support elongated auger shafts 52 by their upper end. The auger shafts are adapted to mix particulate material by means of a flighting 53 spirally wound on the outer surface thereof. Rollers 54 are mounted on brackets 50 and engage roll member 26 and serve the same purpose as they serve in the aforementioned patents. Belt drives 56 are mounted on the upper ends of auger shafts 52 and can be driven by a suitable source of power, (i.e. motors 51A, FIGS. 2 and 4).

Figure 4:
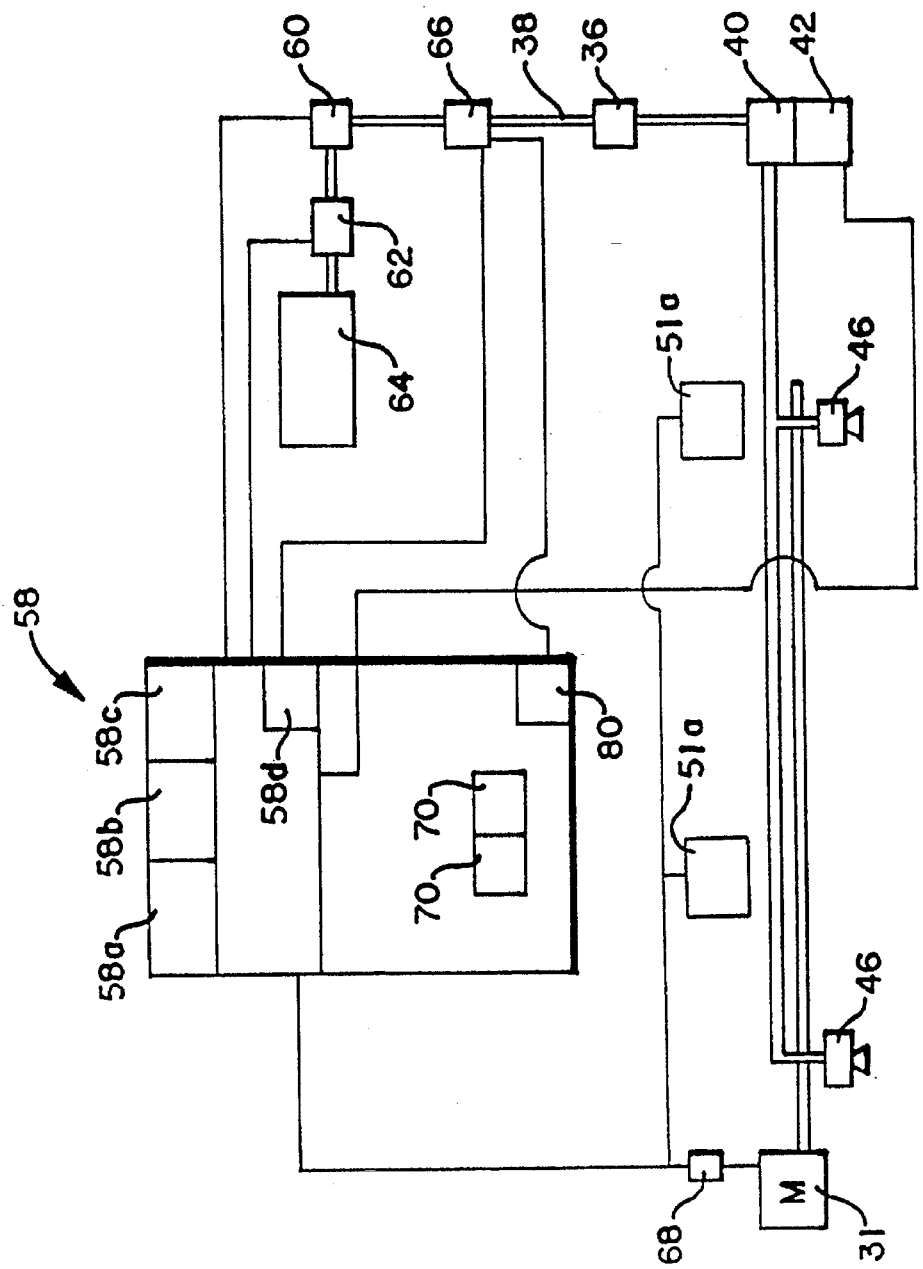
FIG. 4 is a block diagram of the computer which controls the various components of the system.

With reference to FIG. 4, a computer 58 has input stations 58a, 58b, and 58c to receive such information as the existing moisture of the particulate material in the bin, the desired ending moisture, and the number of bushels or volume of the particulate material to be moistened. Computer 58 has a calculator 58d which calculates the pounds of moisture to be added to the particulate material after taking into account the amount of particulate material, the moisture content thereof, and the amount of water desired in the final mix. The computer 58 can be activated to in turn activate pump 60 which pumps water through fluid regulator 62 and into fluid conduit 38. When in operation, the pumped fluid then proceeds through support bearing 36 and thence to swivel 40. If solenoid valve 42 is open, the fluid proceeds through fluid conduit 44 to nozzles 46 where the fluid is dispensed in the form of a mist. The solenoid valve 42 will cut off the water flow if the motor 31 is stopped by a mercury switch 68 which detects a lag in one of the auger shafts 52. The swivel 40 allows the device to move around the interior of the bin without the conduit 38 or the conduit 44 becoming twisted.

The fluid flow sensor 66 is a Micro Trak FM 500 flow sensor. The sensor 66 is input to a counter and a frequency to voltage converter. (Not shown). The current reflects the current flow rate. The flow rate can be changed according to operating conditions. The computer continually displays the gallons yet to be applied to the particulate material and the current flow rate through the display window 70 (FIG. 4).

The computer 58 adjusts the regulator 62 to maintain the desired flow rate. The regulator 62 is a bypass and a valve. The bypass allows the excess water from the pump to flow back into the reservoir 64. The valve is operated by the computer to produce less flow to the nozzles in the bin as required. When the bypass is operative, opening the valve increases flow to the nozzles and reduces flow through the bypass.

When the counter 80 (FIG. 4) reaches the calculated value, all the water has been added and the pump 60 is shut off.

While the drawings depict use of the invention in a round bin, the device of the invention could also be moved transversely across the width or length of a rectangular bin.

Moisture is added to rice just prior to being packaged. This invention and the method and apparatus thereof permit rice to be quickly and easily moisturized at a cost of approximately $5,000 as compared to much more expensive equipment. Accordingly, it is seen that this invention will achieve at least all of its stated objectives.

What is claimed is:

1. The method of adding moisture to particulate material, comprising, placing particulate material in the lower portion of a bin, rotating vertically disposed spaced augers about a longitudinal axis, and moving said augers in concentric paths through said particulate material, and determining the existing moisture content of said particulate material, determining the desired moisture content of said particulate material, determining the quantity of said particulate material, calculating the amount of water to be added to achieve said desired moisture content, spraying moisture on the upper surface of said particulate material adjacent said augers.

and stopping said spraying of moisture when said desired moisture level is reached.

* * * * *